(12) United States Patent
Xia et al.

(10) Patent No.: US 10,445,208 B2
(45) Date of Patent: Oct. 15, 2019

(54) TUNABLE, EFFICIENT MONITORING OF CAPACITY USAGE IN DISTRIBUTED STORAGE SYSTEMS

(71) Applicant: LinkedIn Corporation, Sunnyvale, CA (US)

(72) Inventors: Ming Xia, San Jose, CA (US); Sivabalan Narayanan, Santa Clara, CA (US); Xun Yin, Toronto (CA); Ashish Singhai, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/693,729

(22) Filed: Sep. 1, 2017

(65) Prior Publication Data
US 2018/0373615 A1    Dec. 27, 2018

Related U.S. Application Data

(60) Provisional application No. 62/524,403, filed on Jun. 23, 2017.

(51) Int. Cl.
*G06F 11/34* (2006.01)
*G06F 3/06* (2006.01)
(Continued)

(52) U.S. Cl.
CPC ........ *G06F 11/3452* (2013.01); *G06F 3/0605* (2013.01); *G06F 3/065* (2013.01);
(Continued)

(58) Field of Classification Search
None
See application file for complete search history.

(56) References Cited

U.S. PATENT DOCUMENTS

| 7,047,386 | B1 * | 5/2006 | Ngai ................... G06F 9/5016 711/170 |
| 7,877,754 | B2 * | 1/2011 | Birkestrand .......... G06F 9/5072 718/104 |

(Continued)

OTHER PUBLICATIONS

Wikipedia; "Object Storage", downloaded from the Internet at https://en.wikipedia.org/wiki/Object_storage on May 24, 2018.
(Continued)

*Primary Examiner* — Isaac T Tecklu
(74) *Attorney, Agent, or Firm* — Park, Vaughan, Fleming & Dowler LLP; Chia-Hsin Suen

(57) ABSTRACT

The disclosed embodiments provide a system for monitoring resource usage statistics. During operation, the system obtains a set of expiration times associated with usage of the resource. Next, the system selects a first limit to a number of time slots for use in calculating usage statistics for the resource based on a memory efficiency associated with calculating the usage statistics for the resource. The system then populates, up to the first limit, a set of time slots after a current time with the expiration times. When a time slot in the set of time slots includes the current time, the system uses a subset of the expiration times in the time slot to update one or more usage statistics for the resource. Finally, the system outputs the one or more usage statistics for use in managing the usage of the resource.

20 Claims, 7 Drawing Sheets

(51) Int. Cl.
  *G06F 9/50*    (2006.01)
  *G06F 12/02*   (2006.01)
  *G06F 11/30*   (2006.01)

(52) U.S. Cl.
  CPC .......... *G06F 3/067* (2013.01); *G06F 3/0619* (2013.01); *G06F 3/0653* (2013.01); *G06F 9/5016* (2013.01); *G06F 11/3034* (2013.01); *G06F 12/0253* (2013.01)

(56) References Cited

U.S. PATENT DOCUMENTS

| | | | | |
|---|---|---|---|---|
| 8,117,505 | B2* | 2/2012 | Sridharan | G06F 11/004 700/108 |
| 8,135,795 | B2* | 3/2012 | Birkestrand | G06F 9/50 709/208 |
| 9,454,321 | B1* | 9/2016 | Smaldone | G06F 3/061 |
| 9,674,374 | B1* | 6/2017 | Bolton | H04M 15/88 |
| 9,971,544 | B1* | 5/2018 | Johnson | G06F 16/113 |
| 10,146,449 | B1* | 12/2018 | Labonte | G06F 3/0616 |
| 10,146,450 | B1* | 12/2018 | Lin | G06F 3/0617 |
| 2004/0215536 | A1* | 10/2004 | Deliwala | G06Q 10/10 705/34 |
| 2004/0260811 | A1* | 12/2004 | Cherkasova | H04L 29/06 709/225 |
| 2005/0198360 | A1* | 9/2005 | Grimm | G06F 9/5011 709/233 |
| 2008/0221941 | A1* | 9/2008 | Cherkasova | G06F 9/505 718/106 |
| 2008/0244609 | A1* | 10/2008 | Birkestrand | G06F 9/5077 718/104 |
| 2010/0017506 | A1* | 1/2010 | Fadell | H04M 15/00 709/224 |
| 2010/0035576 | A1* | 2/2010 | Jones | G06Q 30/0251 455/406 |
| 2010/0250748 | A1* | 9/2010 | Sivasubramanian | G06F 9/5016 709/226 |
| 2011/0161973 | A1* | 6/2011 | Klots | H04L 47/805 718/104 |
| 2011/0283289 | A1* | 11/2011 | Jayaraman | G06F 9/5061 718/104 |
| 2012/0137101 | A1* | 5/2012 | Arcese | G06F 9/5016 711/170 |
| 2012/0304191 | A1* | 11/2012 | Morgan | G06F 9/5088 718/105 |
| 2014/0281330 | A1* | 9/2014 | Baldwin | G06F 12/023 711/170 |
| 2014/0358710 | A1* | 12/2014 | Balestrieri | G06Q 30/0601 705/26.1 |
| 2015/0254108 | A1* | 9/2015 | Kurtzman | G06F 9/5016 718/104 |
| 2015/0256476 | A1* | 9/2015 | Kurtzman | G06F 16/24578 709/226 |
| 2015/0278061 | A1* | 10/2015 | Siciliano | H04L 47/762 702/186 |
| 2016/0162369 | A1* | 6/2016 | Ahn | G06F 11/1451 707/654 |
| 2016/0330137 | A1* | 11/2016 | Avci | G06F 9/5016 |
| 2017/0324633 | A1* | 11/2017 | Lehner | H04L 43/0876 |
| 2018/0063026 | A1* | 3/2018 | Beveridge | H04L 47/822 |
| 2018/0121101 | A1* | 5/2018 | Thind | G06F 16/185 |
| 2018/0203640 | A1* | 7/2018 | Chen | G06F 3/0647 |
| 2018/0285008 | A1* | 10/2018 | Challagolla | G06F 3/0631 |
| 2018/0285166 | A1* | 10/2018 | Roy | G06F 9/45558 |
| 2018/0314616 | A1* | 11/2018 | Savolainen | G06F 9/50 |

OTHER PUBLICATIONS

Beaver et al.; "Finding a needle in Haystack: Facebook's photo storage", OSDI. vol. 10. No. 2010.2010, Available at: https://www.usenix.org/legacy/event/osdi10/tech/full_papers/Beaver. pdf.

Muralidhar et al.; "f4: Facebook's Warm BLOB Storage System", Proceedings of the 11th USENIX Symposium on Operating Systems Design and Implementation, Oct. 6-8, 2014.

Ghemawat et al.; "The Google File System", SOSP '03, Oct. 19-22, 2003, Bolton Landing, New York.

Noghabi et al.; "Ambry: LinkedIn's Scalable Geo-Distributed Object Store", SIGMOD '16, Jun. 26-Jul. 1, 2016, San Francisco, CA USA.

* cited by examiner

TUNABLE, EFFICIENT MONITORING OF CAPACITY USAGE IN DISTRIBUTED STORAGE SYSTEMS

RELATED APPLICATION

This application claims priority to U.S. Provisional Application Ser. No. 62/524,403, entitled "Monitoring Capacity Usage in Distributed Storage Systems," filed on 23 Jun. 2017, which is incorporated herein by reference.

BACKGROUND

Field

The disclosed embodiments relate to distributed storage systems. More specifically, the disclosed embodiments relate to techniques for performing tunable, efficient monitoring of capacity usage in distributed storage systems.

Related Art

Binary large object (BLOB) storage systems are commonly used to store binary data such as images, audio, video, multimedia, documents, and/or executable code for a large number of users. When the user population and/or number of blobs exceed the resources of a single machine in the storage system, the storage system may be horizontally scaled into one or more clusters of machines that appear as a single, unified system to the users. In turn, a given user's usage of a storage system may be tracked to facilitate such scaling and/or additional objectives such as usage-based billing, enforcing usage quotas, projecting future hardware needs, diagnosing suspicious activities and irregular system performance, placement of geography-sensitive data, and/or providing statistics for garbage collection.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
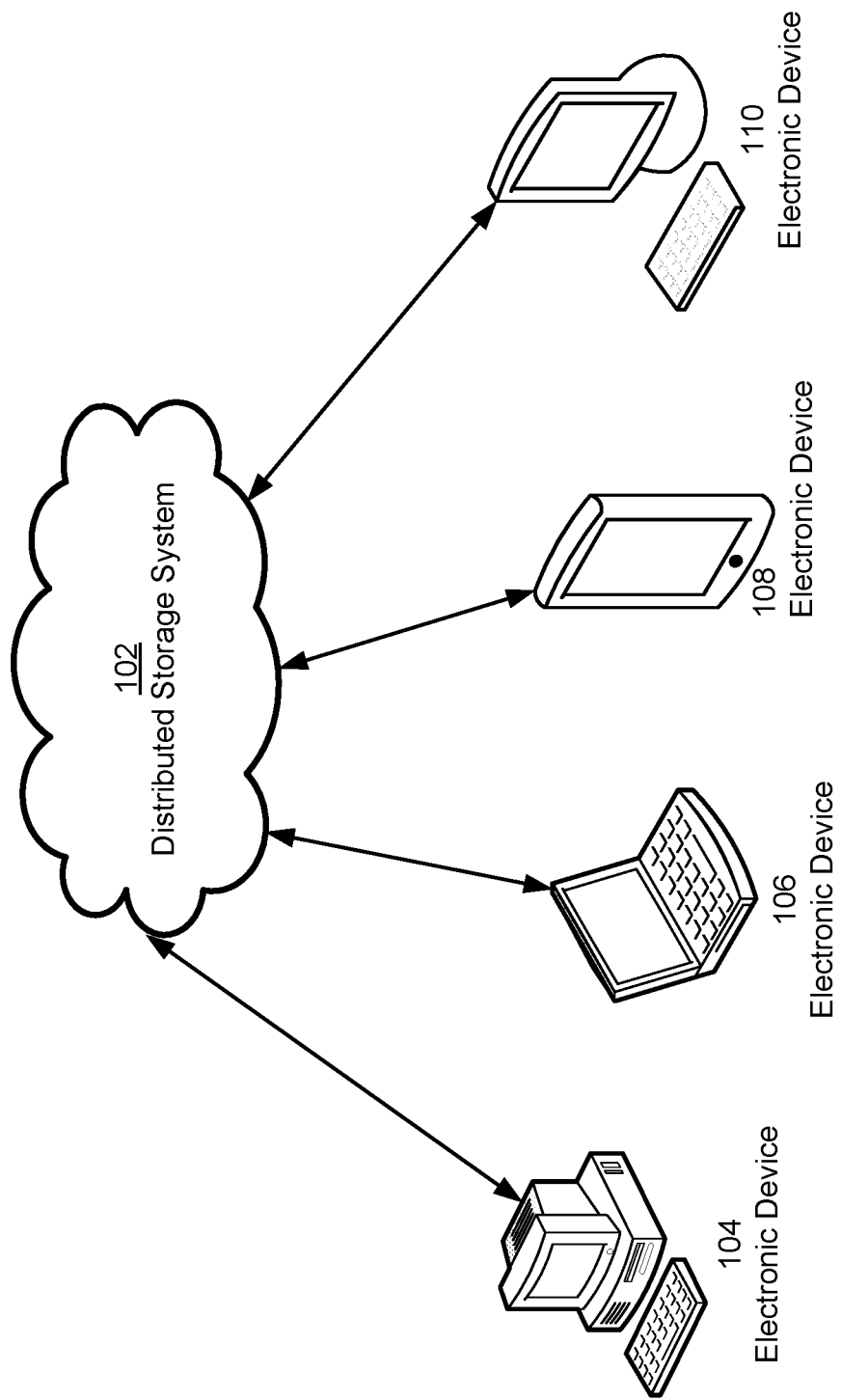
FIG. 1 shows a schematic of a system in accordance with the disclosed embodiments.

The disclosed embodiments provide a method, apparatus, and system for aggregating and monitoring usage statistics for a system. As shown in FIG. 1, the system may include a distributed storage system 102 that is accessed from a set of electronic devices 104-110 such as personal computers, laptop computers, tablet computers, mobile phones, personal digital assistants, portable media players, digital media receivers, and/or other network-enabled electronic devices. Communication between electronic devices 104-110 and distributed storage system 102 may be enabled by one or more networks, such as a local area network (LAN), wide area network (WAN), personal area network (PAN), virtual private network, intranet, cellular network, Wi-Fi network (Wi-Fi® is a registered trademark of Wi-Fi Alliance), Bluetooth (Bluetooth® is a registered trademark of Bluetooth SIG, Inc.) Newport, universal serial bus (USB) network, and/or Ethernet network.

During use of distributed storage system 102, users of electronic devices 104-110 may perform tasks related to storage, backup, retrieval, sharing, and/or synchronization of data. For example, each user may use an electronic device to store images, audio, video, documents, executables, binary objects, and/or other files or types of data with a user account of the user on distributed storage system 102. To access the files and/or user account, the user may provide authentication credentials for the user account from the electronic device to distributed storage system 102. The user may also enable access to the files from other devices and/or users by providing the same authentication credentials to distributed storage system 102 from the other electronic devices, authorizing access to the files from user accounts of the other users, and/or placing the files into a publicly accessible directory on distributed storage system 102.

To provide functionality related to data storage, backup, sharing, synchronization, and/or access, distributed storage system 102 may store the data using one or more storage mechanisms. For example, distributed storage system 102 may use one or more servers, cloud storage, network-attached storage (NAS), a storage area network (SAN), a redundant array of inexpensive disks (RAID) system, and/or other network-accessible storage to store the data. Distributed storage system 102 may additionally store the data using a variety of filesystem architectures and/or hierarchies and obscure the physical locations and/or mechanisms involved in storing the data from electronic devices 104-110. In another example, distributed storage system 102 may store files and/or data as immutable binary large objects (BLOBs) on one or more clusters and/or partitions.

Electronic devices 104-110 may also use one or more network protocols to access and/or use distributed storage system 102. For example, electronic devices 104-110 may use Secure Shell (SSH), SSH File Transfer Protocol (SFTP), secure copy (SCP), and/or another remote shell and/or file transfer protocol to read, write, create, delete, and/or modify files and/or directories in the distributed storage system. Electronic devices 104-110 may also interact with distributed storage system 102 using a number of different commands or requests. For example, each electronic device may use a "put" command to upload a file to distributed storage system 102, a "get" command to retrieve a file from distributed storage system 102, and a "delete" command to remove a file from distributed storage system 102.

Distributed storage system 102 may additionally support expiration times for files, content, and/or data uploaded from electronic devices 104-110. Continuing with the previous example, one or more "put" commands to distributed storage system 102 may specify a counter and/or timestamp representing a time to live (TTL) and/or expiration time for the corresponding file(s). Once the current time reaches the TTL and/or expiration time for a given file, distributed storage system 102 may stop serving the file in response to any "get" requests for the file. Space occupied by the file may then be reclaimed in a subsequent cleanup operation.

Those skilled in the art will appreciate that expiration times associated with data in distributed storage system 102 may complicate the calculation of usage statistics for users and/or other entities associated with distributed storage system 102. More specifically, distributed storage system 102 may calculate a "capacity usage" statistic for each user as the amount of space occupied by the user's data in distributed storage system 102. As a result, "put" and "delete" requests from the user may serve as triggers that respectively increment and decrement the user's capacity usage by the corresponding size of each file uploaded and deleted by the user.

On the other hand, files with TTLs or silent expiration times may be deleted sometime after the corresponding user requests, thereby requiring a separate mechanism to accurately track changes in capacity usage according to the expiration times. A naïve approach may populate an in-memory event queue with a set of events that trigger at the expiration times for the corresponding objects in distributed storage system 102. When an event in the event queue is triggered (i.e., when the current time reaches the expiration time represented by the event), distributed storage system 102 may subtract the size of the expired file or object represented by the event from the corresponding user's capacity usage. However, distributed storage system 102 may store millions to billions of objects, each with a potential expiration time, which may exceed the memory available to distributed storage system 102. At the same time, a large number of objects may expire at or around the same time, which may spike processor load without significantly improving the accuracy of the usage statistics.

In one or more embodiments, distributed storage system 102 includes functionality to efficiently calculate capacity usage statistics for users of distributed storage system 102. As described in further detail below, such capacity usage tracking may support silent expiration times and use periodic scanning of metadata to collect time-ordered, bounded-size buckets of expiration times and track changes in capacity over different time periods with tunable scan frequency and bucket size.

Figure 2:
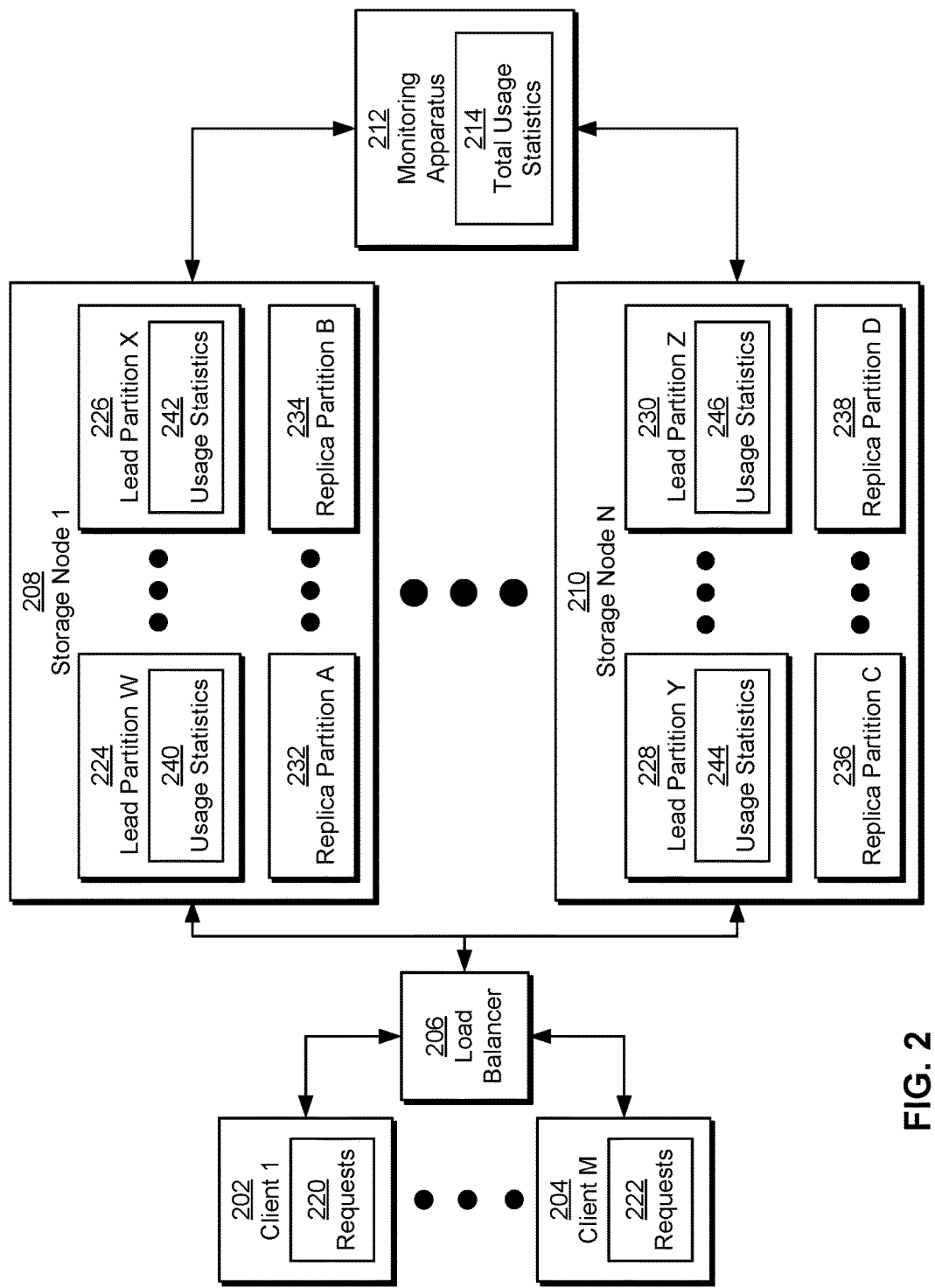
FIG. 2 shows a system for monitoring capacity usage in a distributed storage system in accordance with the disclosed embodiments.

As shown in FIG. 2, usage statistics 240-246 for a distributed storage system (e.g., distributed storage system 102 of FIG. 1) may be calculated and/or tracked by a set of lead partitions 224-230 distributed across a set of storage nodes 208-210 in one or more clusters and/or data centers. More specifically, storage node 1 208 may include a number of lead partitions (e.g., lead partition w 224, lead partition x 226), and storage node n 210 may include a different, non-overlapping set of lead partitions (e.g., lead partition y 228, lead partition z 230).

Each lead partition may store a different, non-overlapping set of data from users and/or other entities (e.g., hosts, organizations, applications, networks, etc.) with access to the distributed storage system. For example, all files, binary objects, and/or other types of data in the distributed storage system may be distributed across the lead partitions using a hash-based partitioning strategy, round robin partitioning strategy, range partitioning strategy, list partitioning strategy, composite partitioning strategy, and/or another type of partitioning strategy.

Data in the lead partitions may also be backed up and/or replicated through a set of replica partitions in the distributed storage system. In particular, storage node 1 208 may include a set of replica partitions (e.g., replica partition a 232, replica partition b 234), and storage node n 210 may include a different, potentially overlapping set of replica partitions (e.g., replica partition c 236, replica partition d 238). Each replica partition may replicate data from a lead partition and/or another replica partition. Put another way, a given set of data in the distributed storage system may be replicated across multiple partitions, with one replica selected to be a lead partition that is used to calculate usage statistics for the data set.

Such replication of data in the lead partitions may be performed to ensure availability and fault tolerance in the system. For example, a given data set may be replicated in three partitions (e.g., one lead partition and two replica partitions), and all three partitions may be placed on different storage nodes. As a result, the system may continue to serve requests for data in the partitions during an outage, failure, and/or other issue with one or even two of the storage nodes.

Because data in the distributed storage system is replicated from the lead partitions to the replica partitions, usage statistics 240-246, such as per-user or per-entity capacity usage statistics, can be calculated using only the lead partitions. Alternatively, one or more replica partitions may be used to track usage statistics 240-246, in lieu of and/or in addition to any usage tracking performed by the corresponding lead partitions.

Requests to the distributed storage system may be received from a number of clients (e.g., client 1 202, client m 204). For example, each client may execute on an electronic device (e.g., electronic devices 104-110 of FIG. 1)

and initiate a session with the distributed storage system by providing authentication credentials for a user and/or other entity with access to the distributed storage system. The client may transmit a username, password, biometric fingerprint, digital certificate, security token, public key, personal identification number (PIN), knowledge-based authentication factor, and/or pattern factor in a request (e.g., requests 220-222) to connect to the remote storage system. The request may be received by a load balancer 206 and routed to a storage node based on a round-robin load-balancing technique, the location of the corresponding client, the distribution of data across the storage nodes and/or partitions, current loads of the storage nodes, and/or another load-balancing technique.

After establishing a session with the distributed storage system, the client may transmit subsequent requests 220-222 for storing, retrieving, and/or deleting data using the distributed storage system. As mentioned above, the requests may include get, put, and/or delete requests. Each put request may include an optional TTL and/or expiration time for the corresponding data (e.g., file, document, image, audio, video, binary object, database record, etc.). In turn, the put requests may be distributed to different storage nodes using one or more partitioning strategies described above. For example, a "frontend node" (not shown) in the distributed storage system may use a round-robin partitioning technique to select, from a list of partitions with available capacity, a given lead partition in which to store data from a client's put request. As the data is received from the client, the data may be streamed to the lead partition and any replica partitions of the lead partition. After a pre-specified amount of the data is successfully stored in the partitions (e.g., after a certain number of successful responses have been received from the partitions in response to one or more portions of the data), the frontend node may respond to the request with a unique identifier for the data. In turn, the client and/or other clients may use the identifier to subsequently retrieve, modify, and/or delete the data.

To calculate usage statistics 240-246, each lead partition may maintain a table and/or other data structure containing the storage capacity consumed by each user and/or entity within that lead partition. For example, the data structure may map user identifiers to the amount of storage in the lead partition consumed by the corresponding users. In turn, usage statistics 240-246 from all lead partitions may be aggregated into a set of total usage statistics 214 by a monitoring apparatus 212 in the system. For example, monitoring apparatus 212 may collect, from the lead partitions, a set of capacity usage statistics for each user or entity and sum the capacity usage statistics to obtain a total capacity usage for the user or entity.

In one or more embodiments, usage statistics 240-246 are initially and/or periodically generated by each lead partition by scanning usage records associated with the distributed storage system. Each usage record may contain metadata related to the type of usage (e.g., create, delete, etc.) and/or the amount of storage impacted by the usage. For example, a lead partition may obtain a series of chronological usage records for a given user or entity from a log of activity with the lead partition. The usage records may include the following exemplary format:

CREATE(10 MB), CREATE(3 MB), DELETE(3 MB), CREATE(5 MB, expired), CREATE(7 MB)

Thus, the capacity usage of the user or entity at the time of scan may be calculated by iterating through the corresponding usage records, incrementing the capacity usage by the amount associated with each create record that has not expired, and decrementing the capacity usage by the amount associated with each delete record. For example, the exemplary usage records above may be used to calculate the user's capacity usage as 10 MB+3 MB−3 MB+7 MB, or 17 MB.

While such scanning may produce the most accurate usage statistics 240-246, per-record iteration performed during the scan may result in linear time complexity with respect to the number of usage records in the distributed storage system. To reduce computational overhead associated with iterating through a large number (e.g., hundreds of thousands to millions) of usage records in a given lead partition, such scanning may be performed on an infrequent basis (e.g., every few months to a year). In turn, tracking and updating of usage statistics 240-246 between scans may be performed in a more computationally efficient manner, as discussed below.

More specifically, after generating a set of capacity and/or other usage statistics 240-246 from a scan of usage records, each lead partition may update the usage statistics based on subsequent requests and/or events that affect usage of the distributed storage system. As discussed above, each put and delete request received by the lead partition may serve as a trigger for respectively incrementing and decrementing the capacity usage for the corresponding user by the amount of data affected by the request.

To efficiently update usage statistics 240-246 in response to future expiration times from the put requests, each lead partition may consolidate the expiration times into a limited number of time slots within a future "forecast period." When a time slot includes the current time (e.g., when the current time reaches the beginning, middle, or end of the time slot), a single in-memory event representing the time slot may apply all the expiration times in the time slot to the corresponding capacity usages. After the forecast period has lapsed, the lead partition may trigger another full scan of usage records to recalculate the capacity usages from all data stored in and/or deleted from the lead partition. In turn, the distributed storage system may tune the number of time slots, time slot size, and/or forecast period to balance the tradeoff between memory efficiency, computational overhead, and/or accuracy during calculation of usage statistics 240-246, as described in further detail below with respect to FIG. 3.

Those skilled in the art will appreciate that the system of FIG. 2 may be implemented in a variety of ways. First, load balancer 206, the storage nodes, the lead partitions, the replica partitions, and/or monitoring apparatus 212 may be provided by a single physical machine, multiple computer systems, one or more clusters, one or more virtual machines, a grid, one or more databases, one or more filesystems, and/or a cloud computing system. Second, load balancer 206, the storage nodes, the lead partitions, the replica partitions, and/or monitoring apparatus 212 may be scaled to the request volume and/or amount of processing, storage, and/or tracking of usage statistics 240-246 associated with the distributed storage system. Third, the number of lead partitions, the number of replica partitions per lead partition, the size of each partition, and/or other parameters related to partitioning of data in the distributed storage system may be tuned based on the number of storage nodes, the capacity of each storage node, the distribution of load across the storage nodes and/or partitions, and/or other factors.

Those skilled in the art will also appreciate that the system of FIG. 2 may be adapted to other types of functionality. For example, operations related to the calculation and/or aggregation of usage statistics may be adapted to other types of systems, metrics, and/or statistics. In another example, silent expiration times may be used to monitor usage statistics representing groups of users, companies, customers, locations, demographic segments, applications or services, usage over a certain period (e.g., the last week, month, or year), projected usage, different types of usage (e.g., storage on HDDs, SSDs, optical drives, etc.), and/or other attributes associated with usage of the system.

Figure 3:
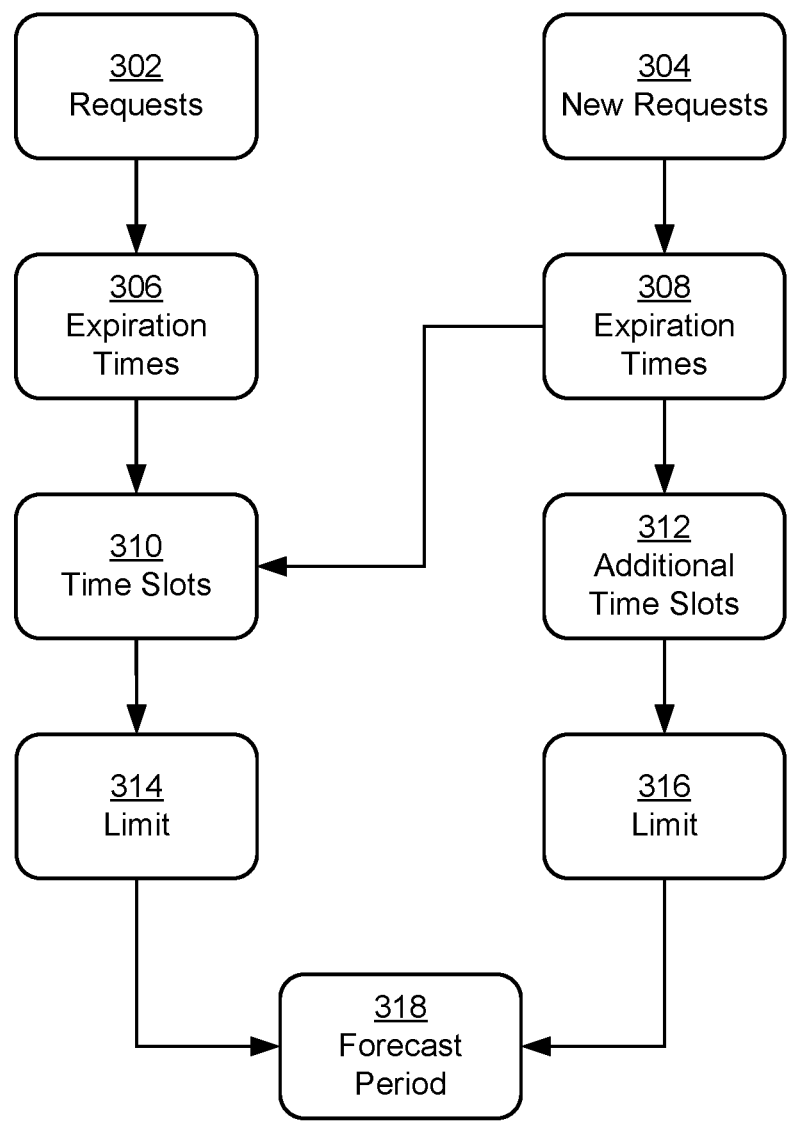
FIG. 3 shows the calculation of usage statistics for a system in accordance with the disclosed embodiments.

FIG. 3 shows the calculation of usage statistics for a system, such as the distributed storage system of FIG. 2, in accordance with the disclosed embodiments. As discussed above, the usage statistics may be updated in response to expiration times 306 associated with requests 302 to the system. For example, expiration times 306 may be obtained from requests 302 to use resources (e.g., put requests to a distributed storage system). Each expiration time may represent a future time at which the corresponding resource (e.g., storage, processor, network, application, virtual machine, utility, etc.) will be freed. In addition, expiration times 306 may specify future times that occur after a scan of usage records in the system is used to build a table and/or other data structure containing usage statistics for the system.

Expiration times 306 may be obtained from requests 302 and used to populate a set of time slots 310. Each time slot may represent a fixed future time interval, such as a fixed span of minutes, hours, or days. The time interval may be selected based on a service level agreement (SLA) and/or other requirements related to the granularity of usage tracking in the system. For example, the time interval spanned by each time slot may be set to one hour to ensure one-hour granularity in updating usage statistics for the system. The time interval may also, or instead, be tuned to balance granularity with other priorities, such as memory and/or computational efficiency.

In turn, requests 302 from some or all users and/or entities with expiration times 306 that fall within a given time slot may be aggregated into a single event representing the time slot. For example, a lead partition in the distributed storage system may aggregate expiration times 306 for all binary objects and/or other types of data in the distributed storage system into a series of one-hour time slots 310. If a given one-hour interval does not include any expiration times, creation of a time slot representing that interval may be omitted to reduce memory overhead associated with tracking usage of the distributed storage system.

In particular, each event may group expirations associated with different users, entities, and/or usages of a given resource within the corresponding time slot into a set of values that will be decremented from the corresponding usage statistics. For example, the event may include one or more entries representing resources freed within the corresponding time slot. Each entry may aggregate, for a different user, a set of file sizes for files from the user that expire within the time slot into a single number representing the reduction in the user's storage capacity usage after the files expire. When the beginning or end of the time slot is reached by the current time, the event may be triggered, and the space occupied by each set of files expiring in the time slot is subtracted from the usage statistic for the corresponding user or entity.

Creation of time slots 310 may additionally be capped at an initial limit 314 to restrict memory consumption associated with calculating the usage statistics. For example, expiration times 306 may be used to create a certain number of time slots 310 to limit the amount of memory occupied by events representing time slots 310. To adhere to limit 314, an existing time slot may optionally be extended to include expiration times that lie just outside the corresponding time interval (subject to granularity requirements associated with updating the usage statistics) instead of creating a new time slot that includes the expiration times.

In turn, the created time slots 310 may span a future forecast period 318 associated with calculating usage statistics prior to the next full scan of usage record in the system. After time slots 310 within forecast period 318 are created, additional expiration times 308 may be obtained from new requests 304 to the system. For example, put requests received by the distributed storage system after creation of time slots 310 may specify expiration times 308 as TTLs for the corresponding data and/or resources.

To ensure that the usage statistics reflect the additional expiration times 308, existing time slots 310 may be updated to include the relevant expiration times 308. For example, a new expiration time that falls within an existing time slot may be added to the event representing the time slot. In turn, the usage statistics may be updated using the new expiration time and all other expiration times in the event when the event is triggered (e.g., when the current time reaches the beginning, middle, or end of the time slot).

On the other hand, some expiration times 308 may not fall within existing time slots 310 that were created within the initial in-memory limit 314. As a result, the expiration times may be used to create additional time slots 312, up to another in-memory limit 316 that is equal to or higher than limit 314. For example, limits 314-316 may be set to the same number of time slots. Thus, an expiration time from a new request may be ignored when the expiration time falls outside forecast period 318, but may be used to create a new time slot when the expiration time is included in forecast period 318 but does not fit into any existing time slots 310. When a new time slot is created within forecast period 318, the latest time slot prior to the end of forecast period 318 (e.g., the time slot with an end that matches the end of forecast period 318) may be deleted, and forecast period 318 may be shortened to exclude the time interval spanned by the deleted time slot.

Alternatively, limit 316 may be higher than limit 314 to allow a certain number of additional time slots 312 to be created as in-memory events and/or other objects without shortening forecast period 318 and/or discarding existing time slots 310. For example, limit 316 may allow for the creation of four additional time slots 312 beyond an initial limit 314 of 10 time slots 310 within forecast period 318. If an additional time slot spans a future time interval that falls beyond (e.g., occurs after) forecast period 318, forecast period 318 may be extended to include the time interval. By setting a higher limit 316 to accommodate additional time slots 312 that aggregate expiration times 308 from new requests 304, the system may avert discarding existing expiration times 306 that have already been aggregated into time slots 310. Moreover, a time slot that has been used to update the usage statistics (e.g., after the event representing the time slot has been triggered) may be discarded from memory, thereby allowing additional time slots 312 to be added and/or forecast period 318 to be extended without violating limit 316.

After forecast period 318 has lapsed and all time slots 310 and/or additional time slots 312 within forecast period 318 have been deleted from memory, a new set of time slots spanning time intervals after the end of forecast period 318 may be created. For example, a new set of time slots spanning a new forecast period may be created during or after a full scan of usage records that is triggered at the end of forecast period 318 and used to recalculate the usage statistics.

Consequently, the time slot size, limits 314-316 to the number of time slots 310 and/or additional time slots 312, and/or forecast period 318 may be tuned to balance the tradeoff between memory efficiency, computational efficiency, and accuracy in calculating the usage statistics. First, memory efficiency and accuracy may be prioritized over computational efficiency by reducing both the time slot size and limits 314-316 that define forecast period 318. The high granularity associated with small time slots and relatively frequent scans between short forecast periods may improve the accuracy of the usage statistics without consuming large amounts of memory, while the frequency of the scans may increase computational overhead.

Second, accuracy and computational efficiency may be prioritized over memory efficiency by maintaining a small time slot size and increasing one or both limits 314-316 to extend forecast period 318. While the high granularity associated with the small time slots is maintained and computational overhead is reduced with less frequent scans, the larger number of time slots 310 and/or additional time slots 312 may increase memory consumption.

Third, memory efficiency and computational efficiency may be prioritized over accuracy by increasing both the time slot size and one or both limits 314-316 to extend forecast period 318. The larger time slot size may reduce the number of time slots 310 and/or additional time slots 312 stored in memory, and the longer forecast period 318 may reduce the computational overhead associated with performing full scans of usage records in the system. On the other hand, the accuracy of the usage statistics may be negatively impacted by the low granularity associated with the time slot size and the infrequency of the scans.

Figure 4:
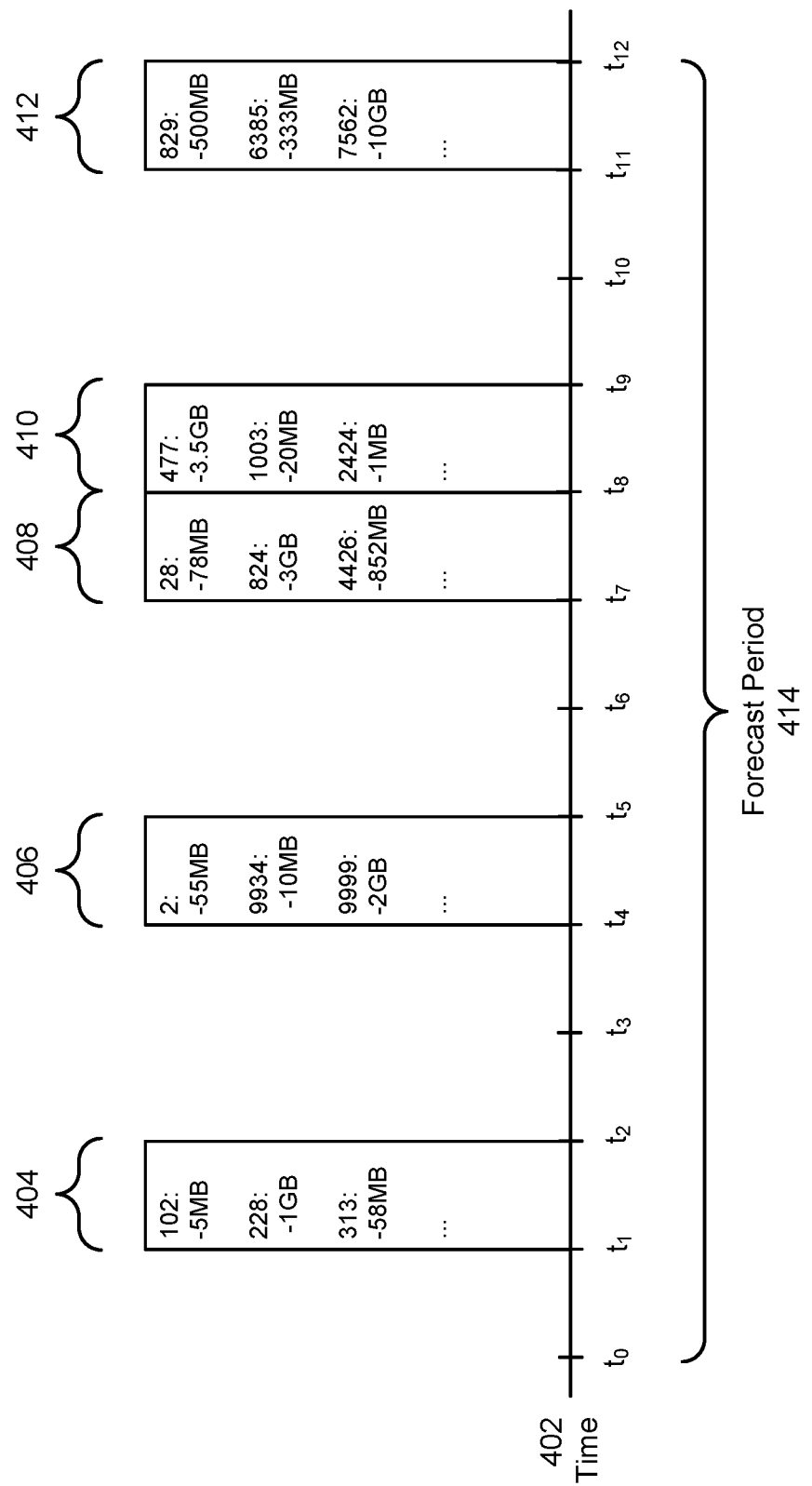
FIG. 4 shows an exemplary timeline associated with calculating usage statistics for a system in accordance with the disclosed embodiments.

FIG. 4 shows an exemplary timeline associated with calculating usage statistics for a system in accordance with the disclosed embodiments. In the timeline, time 402 is divided into 12 substantially fixed-size intervals between times $t_0$ and $t_{12}$. Intervals between times $t_1$ and $t_2$, $t_4$ and $t_5$, $t_7$ and $t_8$, $i_8$ and $t_9$, and $t_{11}$ and $t_{12}$ may be occupied by five time slots 404-412.

As shown in FIG. 4, each time slot 404-412 may include a set of entries, with each entry including an identifier for an entity and an amount of a resource freed by one or more expiration times in the corresponding time interval for the entity. The first three entries in time slot 404 may include entity identifiers of 102, 228, and 313 that map to respective values of −5 MB, −1 GB, and −58 MB. The first three entries in time slot 406 may include entity identifiers of 2, 9934, and 9999 that map to respective values of −55 MB, −10 MB, and −2 GB. The first three entries in time slot 408 may include entity identifiers of 28, 824, and 4426 that map to respective values of −78 MB, −3 GB, and −852 MB. The first three entries in time slot 410 may include entity identifiers of 477, 1003, and 2424 that map to respective values of −3.5 GB, −20 MB, and −1 MB. The first three entries in time slot 412 may include entity identifiers of 829, 6385, and 7562 that map to respective values of −500 MB, −333 MB, and −10 GB.

As a result, resource expiration times that fall within the time interval represented by a given time slot may be aggregated into one or more entries in the time slot. For example, binary objects stored on behalf of a user in a distributed storage system may be associated with TTLs and/or other expiration times. When the expiration time of a binary object is reached, the binary object may be silently deleted by the distributed storage system. To facilitate accurate tracking of the user's capacity usage within the distributed storage system in the absence of an explicit delete request for the binary object from the user, expiration times for binary objects owned by the user that fall within a time interval may be aggregated into a single entry within a time slot spanning the time interval. The entry may specify a numeric user identifier for the user, as well as an amount of space (e.g., number of KB, MB, GB, etc.) freed by the expiration of the user's binary objects in the time interval. The amount of space may be calculated by summing the sizes of the binary objects.

In turn, time slots 404-412 may be used to efficiently update usage statistics for the entities. For example, each time slot may be represented by an event in an event queue. When the current time reaches a given point in the time slot (e.g., the beginning, middle, or end of the time slot), the event may be triggered, and usage statistics for users represented by identifiers in the entries of the time slot may be updated with the corresponding resource expirations (e.g., by subtracting the freed resources from the usage statistics). Because a single event is used to update the usage statistics with all resource expirations within a given time interval, each time slot may represent a significant savings in memory and/or computational overhead over conventional techniques that track usage statistics using a separate event for each resource expiration.

A forecast period 414 for tracking usage statistics using time slots 404-412 may span times $t_0$ to $t_{12}$. Forecast period 414 may initially be determined based on an initial limit to the number of time slots 404-412. For example, forecast period 414 may span a series of time intervals containing the five earliest time slots (e.g., time slots 404-412). At the end of forecast period 414, the usage statistics may be recalculated from usage records associated with the system. For example, a log of every binary object creation and deletion in a distributed storage system may be scanned at the end of forecast period 414 to accurately calculate a set of capacity usages for users of the distributed storage system. The capacity usages may then be updated incrementally over a subsequent forecast period containing another set of time slots.

The length of forecast period 414 may additionally be adjusted in response to changes in the number of time slots in forecast period 414. For example, after time slots 404-412 are initially populated and forecast period 414 is determined, a new time slot spanning the interval between times $t_2$ and $t_3$ may be created in response to a put request for data that contains an expiration time in the interval. Additional time slots within forecast period may continue to be created until a limit to the number of time slots, which may be the same as or higher than the initial number of time slots 404-412 spanned by forecast period 414, is reached. Once the limit is reached, any new time slots created within forecast period 414 may result in the deletion of the latest time slot (e.g., time slot 412) in forecast period 414 and the shortening of forecast period 414 to exclude the time interval spanned by the deleted time slot. On the other hand, forecast period 414 may be extended to include a new time slot after time $t_{12}$ if the new time slot does not exceed the limit.

Figure 5:
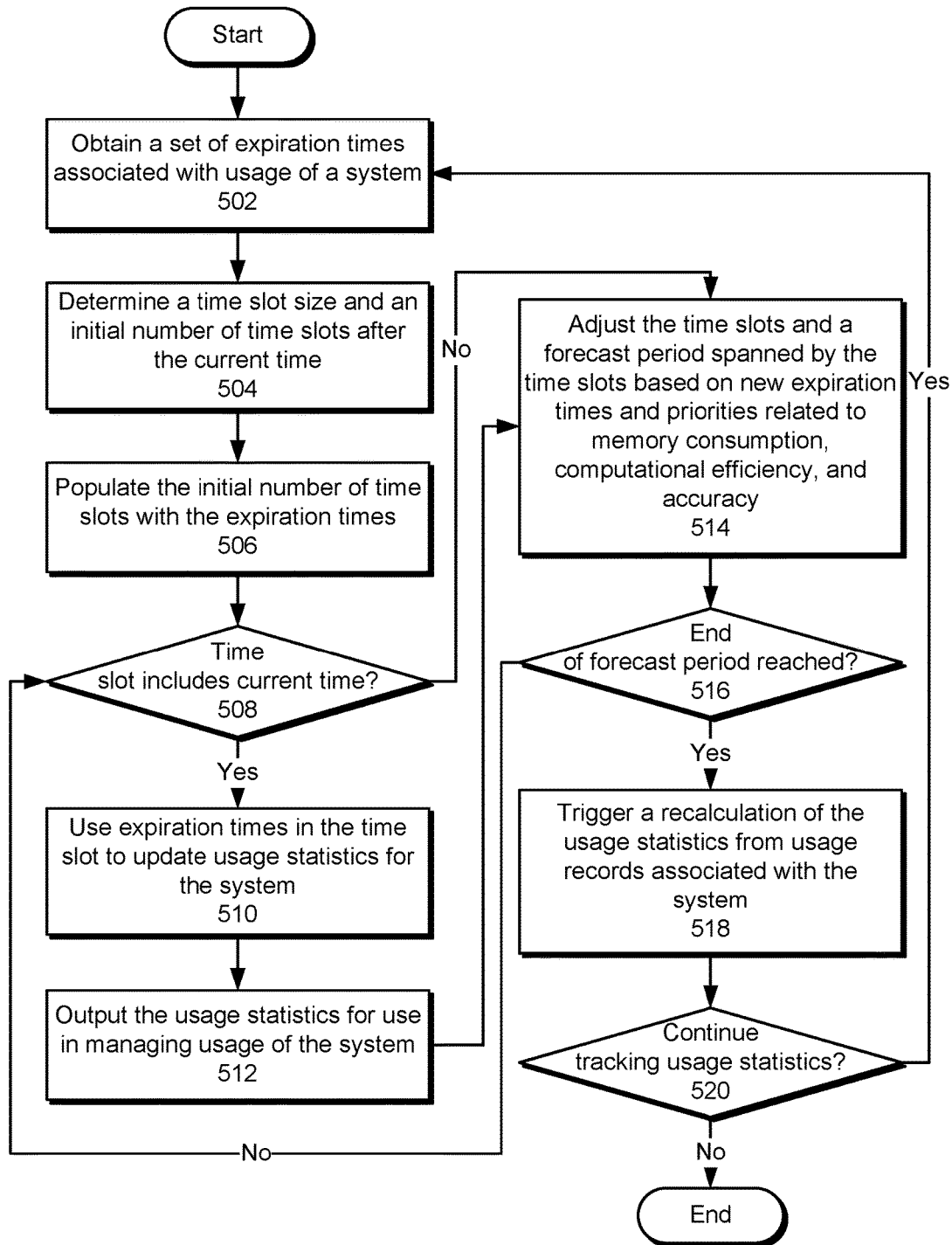
FIG. 5 shows a flowchart illustrating a process of calculating usage statistics for a system in accordance with the disclosed embodiments.

FIG. 5 shows a flowchart illustrating a process of calculating usage statistics for a system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a set of expiration times associated with usage of a system is obtained (operation 502). For example, the expiration times may be obtained as TTLs from put requests that upload binary objects and/or other data to a distributed storage system. Each expiration time may also be obtained with the size of the binary object and/or data that is uploaded in the corresponding put request. Next, a time slot size and an initial number of time slots after the current time are determined (operation 504). The time slot size may represent the length of a time interval spanned by each time slot. The time slot size and initial number of time slots may be selected to balance priorities associated with memory efficiency, computational efficiency, and accuracy.

The initial number of time slots is then populated with the expiration times (operation 506). For example, a set of 10 time slots may be created from future time intervals that are closest to the current time and that include expiration times obtained in operation 502. The number and/or size of the time slots may be selected or tuned to accommodate constraints and/or requirements associated with memory efficiency, computational efficiency, and/or accuracy associated with calculating the usage statistics.

The time slots may be processed based on the current time (operation 508). If the current time falls within a time slot created in operation 506, expiration times in the time slot are used to update usage statistics for the system (operation 510), and the usage statistics are outputted for use in managing usage of the system (operation 512). For example, each time slot may be created as an event that triggers in the beginning, middle, or end of the corresponding time interval. When the event is triggered, usage of a resource associated with expiration times aggregated into the event is subtracted from one or more of the usage statistics.

In the context of tracking storage capacity usage, a given entity (e.g., user, organization, application, device, service, network, etc.) in a distributed storage system may be associated with a set of binary objects that expire within the time interval spanned by the time slot. After the event representing the time slot is triggered, the sum of the sizes of the expiring binary objects may be subtracted from the overall storage capacity consumed by the entity. The process may be repeated for other entities with expiration times in the time slot, and the updated storage capacity usages may be outputted in a table, message, database, and/or other format to facilitate scaling of the distributed storage system, usage-based billing, enforcing usage quotas, projecting future hardware needs, diagnosing suspicious activities and irregular system performance, placement of geography-sensitive data, and/or providing statistics for garbage collection. Updated storage capacity usages from multiple partitions in the distributed storage system may additionally be aggregated into a set of total capacity usages for the entities, as described above.

If the current time does not fall within a time slot, updating of usage statistics may be omitted. Instead, the time slots and a forecast period spanning the time slots may be periodically and/or continually adjusted based on new expiration times and priorities related to memory consumption, computational efficiency, and accuracy (operation 514), as discussed in further detail below with respect to FIG. 6.

The end of the forecast period may be reached (operation 516) by the current time. If the current time is still within the forecast period, time slots in the forecast period may continue to be used to update and output usage statistics for the system (operations 508-512), and the time slots and forecast period may be adjusted in response to new expiration times and/or changes in priority (operation 514). Once the end of the forecast period is reached, a recalculation of the usage statistics from usage records associated with the system is triggered (operation 518). For example, the usage statistics may be recalculated by scanning a log and/or other comprehensive record of resources created and deleted within the system.

After the usage statistics are recalculated from the usage records, the usage statistics may continue to be tracked (operation 520) using a new set of time slots and a new forecast period. If such tracking is to continue, expiration times associated with usage of the system may be obtained (operation 502) and used to populate subsequent time slots of a certain size and number (operations 504-506). The time slots and a new forecast period may then be used to update the usage statistics (operations 508-512) and may also be updated in response to changes in priority or additional expiration times received after creating the initial number of time slots (operation 514). Time slots and forecast periods may continue to be used to track the usage statistics to reduce memory consumption and/or computational overhead associated with monitoring resource usage based on silent expiration times.

Figure 6:
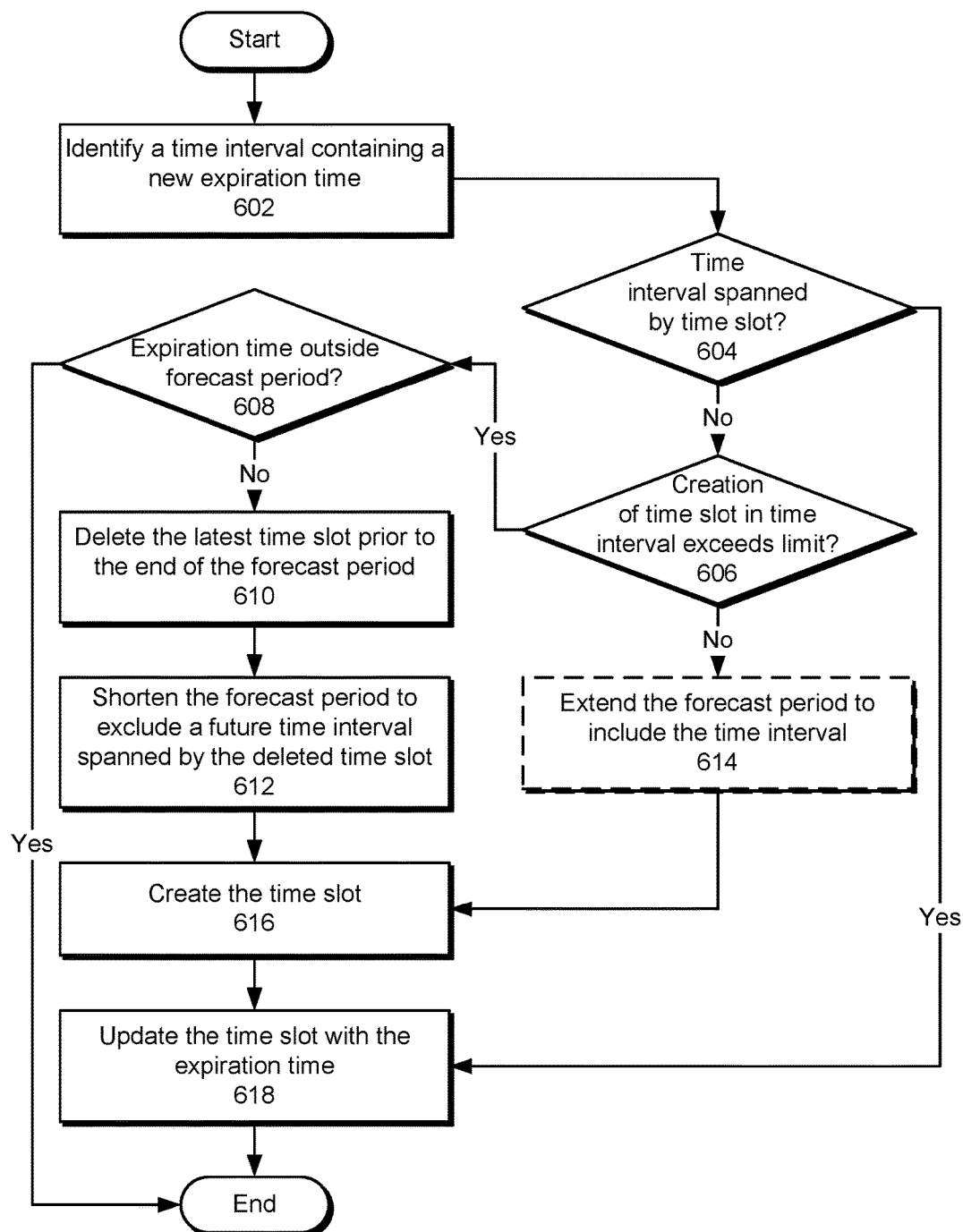
FIG. 6 shows a flowchart illustrating a process of adjusting parameters related to calculating usage statistics for a system in accordance with the disclosed embodiments.

FIG. 6 shows a flowchart illustrating a process of adjusting parameters related to calculating usage statistics for a system in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

First, a time interval containing an expiration time is identified (operation 602). For example, the expiration time may be obtained from a request to create, modify, or delete a resource and placed into a fixed-size future time interval, such as a certain range of minutes, hours, and/or days. The time interval may be spanned by a time slot (operation 604). If the time interval is spanned by a time slot (i.e., if the time slot has already been created in response to another expiration time in the same time interval), the time slot is updated with the expiration time (operation 618). For example, an entry in the time slot may be created or updated to reflect the usage of a resource that will be freed when the expiration time is reached.

If the time interval is not spanned by a time slot, the new expiration time may be processed based on a limit to the number of time slots (operation 606). For example, the limit may be the same as or higher than an initial number of time slots created after the usage statistics are recalculated from a scan of usage records for the system.

If creation of a time slot in the time interval to accommodate the new expiration time does not exceed the limit, the forecast period is optionally extended to include the time interval (operation 614) when the time interval falls beyond the forecast period. The time slot is then created (operation 616) and updated with the expiration time (operation 618).

If creation of the time slot exceeds the limit, the new expiration time is processed based on the forecast period (operation 608). If the expiration time falls outside the forecast period, creating a time slot with the expiration time may be omitted until the forecast period has lapsed and the usage statistics are recalculated using another scan of usage records for the system. If the expiration time falls within the forecast period, the latest time slot prior to the end of the forecast period is deleted (operation 610), and the forecast period is shortened to exclude a future time interval spanned by the deleted time slot (operation 612). The time slot is then created and updated with the expiration time (operations 616-618). In other words, the limit to the number of time slots may be maintained by "ejecting" the latest time slot and shortening the forecast period in response to creating a new, earlier time slot within the forecast period.

Figure 7:
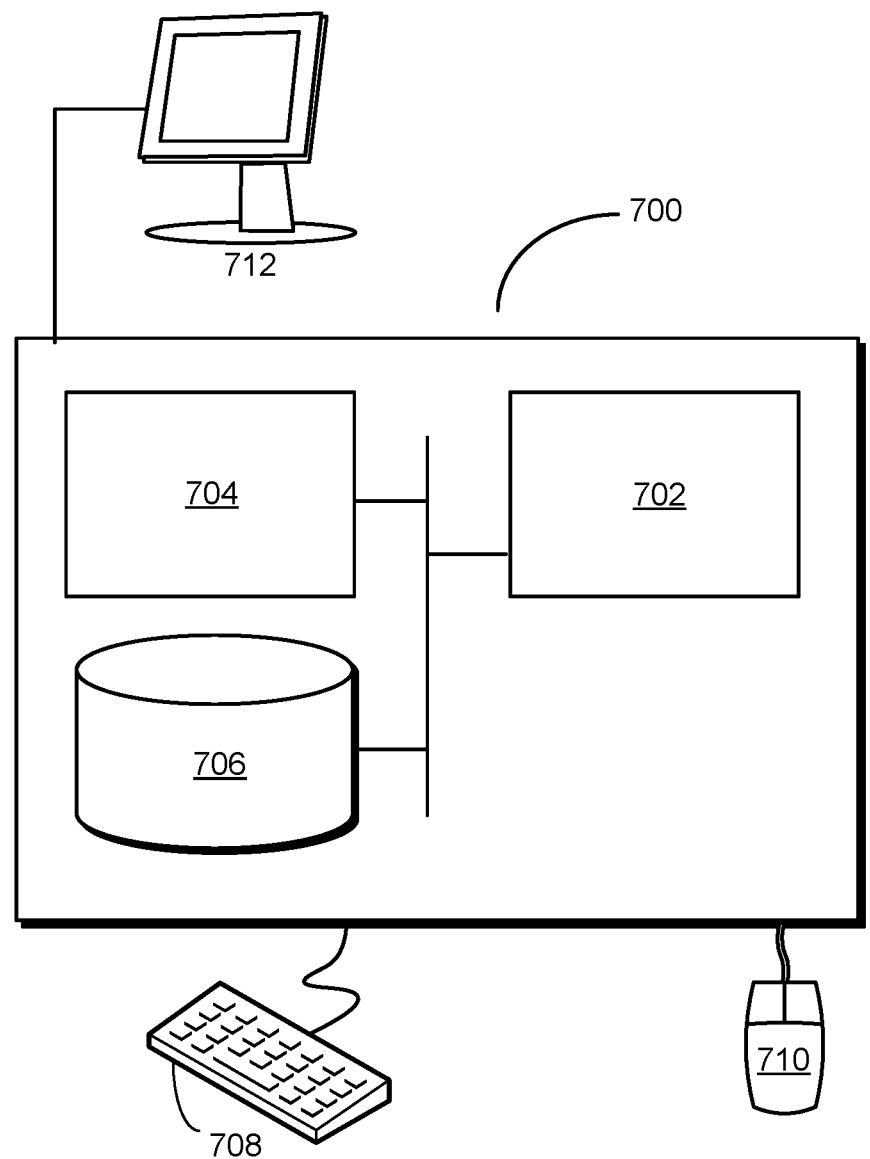
FIG. 7 shows a computer system in accordance with the disclosed embodiments.

FIG. 7 shows a computer system 700. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 monitors usage statistics for a system such as a distributed storage system. First, computer system 700 may obtain a set of expiration times associated with usage of the system. Next, computer system 700 may populate a set of time slots after a current time with the expiration times. When a time slot in the set of time slots includes the current time, computer system 700 may use a subset of the expiration times in the time slot to update one or more usage statistics for the system. For example, computer system 700 may subtract usage of a resource associated with the subset of the expiration times from the usage statistic(s). Finally, computer system 700 may output the usage statistics for use in managing the usage of the system. For example, computer system 700 may aggregate the usage statistics with additional usage statistics from additional components of the system to obtain a set of total usage statistics for one or more users of the system.

In addition, one or more components of computer system 700 may be remotely located and connected to the other components over a network. Portions of the present embodiments (e.g., partitions, storage nodes, load balancer, clients, management apparatus, etc.) may also be located on different nodes of a distributed system that implements the embodiments. For example, the present embodiments may be implemented using a cloud computing system that monitors and update usage statistics for a set of nodes and/or partitions in a remote distributed storage system.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a set of expiration times associated with usage of a resource;
   selecting, by a computer system, a first limit to a number of time slots for use in calculating usage statistics for the resource based on a memory efficiency associated with calculating the usage statistics for the resource;
   creating, based on the set of expiration times, a set of time slots after a current time;
   populating, by the computer system, the set of time slots with the set of expiration times, up to the first limit in the number of time slots;
   when a time slot in the set of time slots includes the current time, using a subset of the expiration times in the time slot to update one or more usage statistics for the resource; and
   outputting the one or more usage statistics for use in managing the usage of the resource.

2. The method of claim 1, further comprising:
   identifying a forecast period spanning the set of time slots; and
   triggering, at an end of the forecast period, a recalculation of usage statistics for the resource from usage records associated with the resource.

3. The method of claim 2, further comprising:
   when a second limit to the number of time slots is exceeded by creating a new time slot within the forecast period:
      deleting a latest time slot prior to the end of the forecast period; and
      shortening the forecast period to exclude a future time interval spanned by the deleted latest time slot.

4. The method of claim 3, wherein the second limit is equal to or higher than the first limit.

5. The method of claim 2, further comprising:
   when a second limit to the number of time slots is not exceeded by creating a new time slot after the forecast period, extending the forecast period to include a future time interval spanned by the new time slot.

6. The method of claim 2, wherein the usage records comprise:
   a create record; and
   a delete record.

7. The method of claim 1, wherein using the subset of the expiration times in the time slot to update the one or more usage statistics for the resource comprises:
   subtracting usage of the resource associated with the subset of the expiration times from the one or more usage statistics.

8. The method of claim 1, wherein outputting the one or more usage statistics comprises:
   aggregating the one or more usage statistics with one or more additional usage statistics for a set of users to obtain one or more total usage statistics for the users.

9. The method of claim 1, wherein the resource comprises a storage resource in a distributed storage system.

10. The method of claim 9, wherein the one or more usage statistics comprise a capacity usage of the distributed storage system.

11. The method of claim 9, wherein the expiration times are assigned to binary objects in the distributed storage system.

12. The method of claim 1, wherein the one or more usage statistics are updated during at least one of:
   a beginning of the time slot;
   a middle of the time slot; and
   an end of the time slot.

13. An apparatus, comprising:
   one or more processors; and
   memory storing instructions that, when executed by the one or more processors, cause the apparatus to:
      obtain a set of expiration times associated with usage of a resource;

select a first limit to a number of time slots for use in calculating usage statistics for the resource based on a memory efficiency associated with calculating the usage statistics for the resource;

create, based on the set of expiration times, a set of time slots after a current time;

populate the set of time slots with the set of expiration times, up to the first limit in the number of time slots;

when a time slot in the set of time slots includes the current time, use a subset of the expiration times in the time slot to update one or more usage statistics for the resource; and output the one or more usage statistics for use in managing the usage of the resource.

14. The apparatus of claim 13, wherein the memory further stores instructions that, when executed by the one or more processors, cause the apparatus to:

identify a forecast period spanning the set of time slots; and trigger, at an end of the forecast period, a recalculation of usage statistics for the resource from usage records associated with the resource.

15. The apparatus of claim 14, wherein the memory further stores instructions that, when executed by the one or more processors, cause the apparatus to:

when a second limit to the number of time slots is exceeded by creating a new time slot within the forecast period:

delete a latest time slot prior to the end of the forecast period; and shorten the forecast period to exclude a future time interval spanned by the latest time slot.

16. The apparatus of claim 15, wherein the second limit is equal to or higher than the first limit.

17. The apparatus of claim 14, wherein the memory further stores instructions that, when executed by the one or more processors, cause the apparatus to:

when a second limit to the number of time slots is not exceeded by creating a new time slot after the forecast period, extend the forecast period to include a future time interval spanned by the new time slot.

18. The apparatus of claim 13, wherein using the subset of the expiration times in the time slot to update the one or more usage statistics for the resource comprises:

subtracting usage of the resource associated with the subset of the expiration times from the one or more usage statistics.

19. The apparatus of claim 13, wherein outputting the one or more usage statistics comprises:

aggregating the one or more usage statistics with one or more additional usage statistics for a set of users to obtain one or more total usage statistics for the users.

20. A system, comprising:

a set of partitions distributed across a set of storage nodes; and a lead partition in the set of partitions, wherein the partition comprises a non-transitory computer-readable medium comprising instructions that, when executed, cause the system to:

obtain a set of expiration times associated with usage of the storage nodes;

select a first limit to a number of time slots for use in calculating usage statistics for the resource based on a memory efficiency associated with calculating the usage statistics for the resource;

create, based on the set of expiration times, a set of time slots after a current time;

populate the set of time slots with the set of expiration times up to the first limit in the number of time slots;

when a time slot in the set of time slots includes the current time, use a subset of the expiration times in the time slot to update one or more usage statistics; and output the one or more usage statistics for use in managing the usage of the storage nodes.

* * * * *